(12) United States Patent
Hirota

(10) Patent No.: US 7,098,980 B2
(45) Date of Patent: Aug. 29, 2006

(54) LIQUID CRYSTAL DISPLAY DEVICE COMPRISING PIXEL AND COMMON ELECTRODES INCLINED IN FIRST AND SECOND DIRECTIONS TO FORM A ZIGZAG SHAPE WHICH IS SYMMETRICAL RELATIVE TO ALIGNMENT DIRECTION OF LIQUID CRYSTAL

(75) Inventor: Naoto Hirota, Toyokawa (JP)

(73) Assignee: Obayashiseikou Co., Ltd., Aichi (JP)

(*) Notice: Subject to any disclaimer, the term of this patent is extended or adjusted under 35 U.S.C. 154(b) by 74 days.

(21) Appl. No.: 10/419,319

(22) Filed: Apr. 19, 2003

(65) Prior Publication Data

US 2003/0223028 A1 Dec. 4, 2003

Related U.S. Application Data

(63) Continuation-in-part of application No. 09/610,815, filed on Jul. 6, 2000, now abandoned, which is a continuation of application No. 09/142,448, filed on Sep. 3, 1998, now Pat. No. 6,288,763.

(30) Foreign Application Priority Data

Apr. 16, 1996 (JP) ................................ 8-158741

(51) Int. Cl.
   *G02F 1/1343* (2006.01)
(52) U.S. Cl. ................ 349/141; 349/145; 349/146
(58) Field of Classification Search ........ 349/141–146, 349/106, 108–110, 139
See application file for complete search history.

(56) References Cited

U.S. PATENT DOCUMENTS

| 5,598,285 | A |   | 1/1997  | Kondo et al. |
| 5,745,207 | A | * | 4/1998  | Asada et al. ............. 349/141 |
| 5,841,498 | A | * | 11/1998 | Baur et al. ............... 349/141 |
| 6,266,116 | B1 | * | 7/2001  | Ohta et al. ............... 349/141 |
| 2002/0044249 | A1 | * | 4/2002 | Hirota .................... 349/146 |

FOREIGN PATENT DOCUMENTS

| JP | 7-134301 | 5/1995 |
| JP | 7-191336 | 7/1995 |
| JP | 9-258269 | 10/1997 |

* cited by examiner

*Primary Examiner*—Andrew Schechter
*Assistant Examiner*—Thoi V. Duong
(74) *Attorney, Agent, or Firm*—Muramatsu & Associates

(57) ABSTRACT

An active matrix type liquid crystal display device where display pixels are constituted on a substrate by scanning signal lines, video signal lines, pixel electrodes, common electrodes and active elements in order to obtain an image having good visual field angle characteristics and a high display quality with less residual image. The substrate is opposed to another substrate having a color filter forming a liquid crystal alignment film, and the liquid crystal layer is held by the two substrates. The electrodes and the active elements are so constituted that an electric field can be applied to the liquid crystal layer substantially in parallel with the substrate. The video signal lines, the common electrodes and the pixel electrodes are bent within a range of 60 to 120 degrees relative to the direction of liquid crystal alignment.

6 Claims, 6 Drawing Sheets

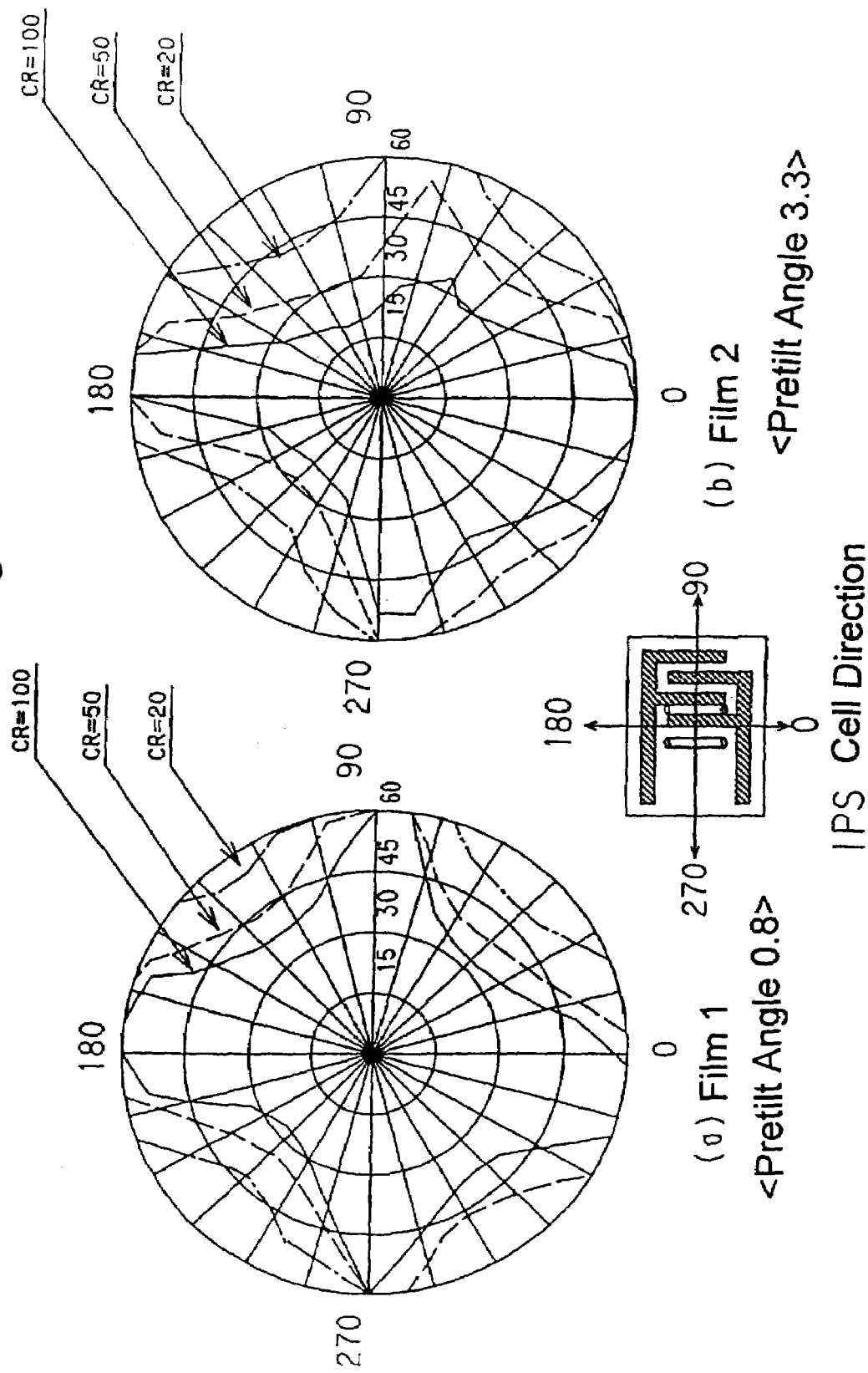

LIQUID CRYSTAL DISPLAY DEVICE COMPRISING PIXEL AND COMMON ELECTRODES INCLINED IN FIRST AND SECOND DIRECTIONS TO FORM A ZIGZAG SHAPE WHICH IS SYMMETRICAL RELATIVE TO ALIGNMENT DIRECTION OF LIQUID CRYSTAL

This is a continuation-in-part of U.S. application Ser. No. 09/610,815 filed Jul. 6, 2000 now abandoned which is a continuation of U.S. application Ser. No. 09/142,448, filed Sep. 3, 1998 now U.S. Pat. No. 6,288,763 which is a 371 of PCT/JP01304 filed Apr. 15, 1997 which claims the benefit of Japanese Patent application No. 8-158741 filed Apr. 16, 1996.

FIELD OF THE INVENTION

This invention relates to an active matrix type liquid crystal display device which has improved visual field angle characteristics and high display quality with less residual image by utilizing bent electrodes.

BACKGROUND OF THE INVENTION

A conventional technology for applying an electric field to a liquid crystal composition layer is proposed, for instance, in Japanese Laid-Open Patent Publication No. 7-36058 and No. 7-159786 in which an electric field is applied to a pair of comb like electrodes formed on a substrate of an active matrix type liquid crystal display device. Heretofore, a display system in which a direction of a primary electric field applied to a liquid crystal composition layer is substantially parallel with a surface of the substrate is referred to as a transverse electric field system.

FIG. 1 shows such a conventional example of a transverse electric field system. In this example, comb like pixel electrodes 5 and 6 are straight and positioned in parallel with one another.

In the above-described transverse electric field system having a conventional pixel electrode structure of FIG. 1, it is known that visual field angle characteristics will change drastically with the change of a pretilt angle as shown in FIG. 10. Thus, in order to achieve good visual angle characteristics in the transverse electric field system, a combination of an alignment film of a very small pretilt angle and liquid crystal is required. According to the experiment, it is desirable that a pretilt angle is less than one (1) degree as shown in FIG. 10.

However, in a vertical electric field system incorporated in liquid crystal displays most widely used today have a pretilt angle of 3–8 degrees between an alignment film and liquid crystal. The vertical electric field system is a display system wherein a direction of a primary electric field is almost vertical to the surface of a substrate. When an alignment film and liquid crystal with one (1) degree of pretilt are used in a liquid crystal display of the vertical electric field system, a reverse tilt domain will be created by the electric field of video signal lines and pixel electrodes, resulting in a significant deterioration in the display quality.

Because of the foregoing reasons, a set of alignment film and liquid crystal to be used in a liquid crystal display based on the transverse electric field system is different from a set of alignment film and liquid crystal to be used in a liquid crystal display system based on the vertical electric field system. When producing liquid crystal display devices of different display systems by the same production facility, alignment films and liquid crystal must be constantly changed, which decreases a production efficiency.

SUMMARY OF THE INVENTION

Therefore, it is an object of the present invention to provide a liquid crystal display device which solves the problem described above.

It is another object of the present invention to provide a liquid crystal display device which is able to incorporate the same alignment film and liquid crystal without regard to the transverse or vertical electric field system to dramatically increase the production efficiency thereof.

This invention is a liquid crystal display device which is comprised of a substrate, scanning lines, video signal lines, thin film transistors provided at crossing points of the scanning lines and the video signal lines, liquid crystal drive electrodes connected to the thin film transistors, an active matrix substrate having at least a portion thereof a common electrode which faces the liquid crystal drive electrodes, a pair of substrates each of which faces the active matrix substrate, and a liquid crystal layer held between the active matrix substrate and the pair of substrate.

In the first embodiment of the present invention, when using the liquid crystal of positive dielectric anisotropy (P-type liquid crystal), the video signal line and the pixel electrode (liquid crystal drive electrode) and the common electrode are bent relative to the alignment direction of the liquid crystal within the angle ranging from ±1 to ±30 degrees.

In the second embodiment of the present invention, when using the liquid crystal of positive dielectric anisotropy (P-type liquid crystal), the scanning line and the pixel electrode (liquid crystal drive electrode) and the common electrode are bent relative to the alignment direction of the liquid crystal within the angle ranging from ±1 to ±30 degrees.

In the third embodiment of the present invention, when using the liquid crystal of negative dielectric anisotropy (N-type liquid crystal), the video signal line and the pixel electrode (liquid crystal drive electrode) and the common electrode are bent relative to the alignment direction of the liquid crystal within the angle ranging from 60 degrees to 120 degrees except 90 degrees.

In the fourth embodiment of the present invention, when using the liquid crystal of negative dielectric anisotropy (N-type liquid crystal), the scanning line and the pixel electrode (liquid crystal drive electrode) and the common electrode are bent relative to the alignment direction of the liquid crystal within the angle ranging from 60 degrees to 120 degrees except 90 degrees.

In the fifth embodiment of the present invention, a color filter and a black mask are incorporated which are bent in the angle which is the same as that of the video signal line and the scanning line used in the above noted first, second, third and fourth embodiments.

By incorporating the above described methods in the first to fourth embodiments, the liquid crystal molecules rotate in two directions, a left rotation and a right rotation, in the area between the pixel electrode (liquid crystal drive electrode as shown in FIGS. 4 and 6 when the transverse electric field is applied to the pixel electrodes.

In the conventional configuration of FIG. 1, only one direction of rotation motion is generated in the pixel when the transverse electric field is applied to the pixel electrode (liquid crystal drive electrode) and the common electrode as shown in FIG. 2. In such a one direction rotation motion, when the pretilt angle is large, disparities of visual field angle property will be induced as shown in FIG. 10.

In contrast, when two directions of rotation motion, i.e., the left and right rotations, are generated for the liquid crystal molecules in one pixel electrode, disparities of visual angle property will not be induced even if the pretilt angle is large.

Thus, in the liquid crystal display device using the structure of the present invention, the combination of the alignment film and the liquid crystal is freely selected without being limited by the pretilt angle. In other words, the method of the present invention can solve the inherent problems in the conventional transverse electric field system such as an inferior residual image and a response speed.

Further in the present invention, since the pretilt angle will not adversely affect the performance even when the combination of the alignment film and liquid crystal of the conventional transverse electric field system is used, the production line for the vertical electric field system needs not be changed, and thus the productivity will not decrease.

By using the above described methods in the first to fifth embodiments, it has become possible to separate the rotation motions of the liquid crystal molecule into two directions in each pixel of colors R, G, and B. Thus, color display with wider visual field angle is achieved.

By using the methods in the first to fourth embodiments noted above, a polarization axis of polarizers to be attached to top and bottom surfaces of the liquid crystal panel can be aligned in a direction either in parallel with major and minor axes of the liquid crystal panel or in perpendicular to the axes. As a result, a determination of cutting angle of the polarizer becomes easy, which improves yield in the production of the polarizer.

Further, by using the methods in the first to fourth embodiments noted above, in an alignment process, a rubbing procedure can be carried out without titling the substrate as shown in FIG. 9. Hence, frictions by the cloth of a rubbing role are uniformly provided, which prevents unevenness in the rotation of the rubbing roll because of the reduction of the unevenness in the alignment process.

BRIEF DESCRIPTION OF THE DRAWINGS

FIG. 10 is a diagram showing a pretilt angle of liquid crystal molecules and visual field characteristics in the liquid crystal display using a transverse electric field system in the conventional technology.

DETAILED DESCRIPTION OF THE PREFERRED EMBODIMENT

Embodiment 1

Figure 1:
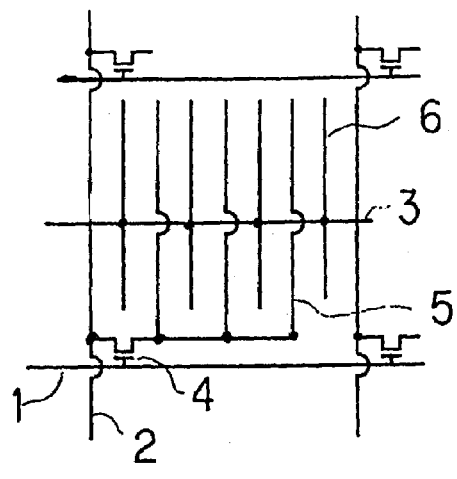
FIG. 1 is a plan view showing a unit pixel in a transverse electric field system in the conventional technology.
Figure 2:
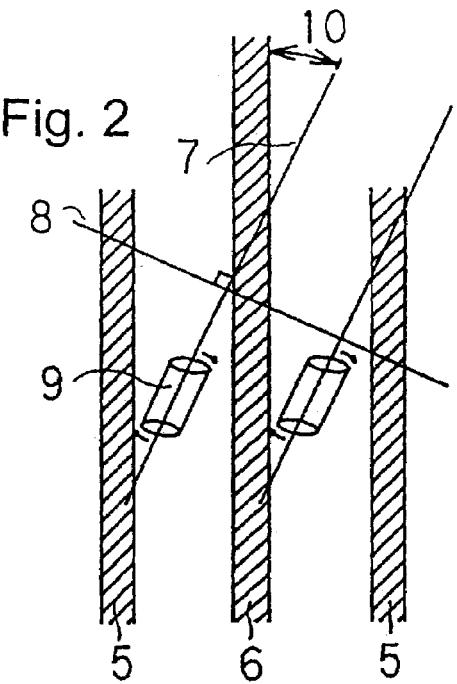
FIG. 2 is a diagram showing an alignment direction of a P-type liquid crystal in a transverse electric field system in the conventional technology.
Figure 3:
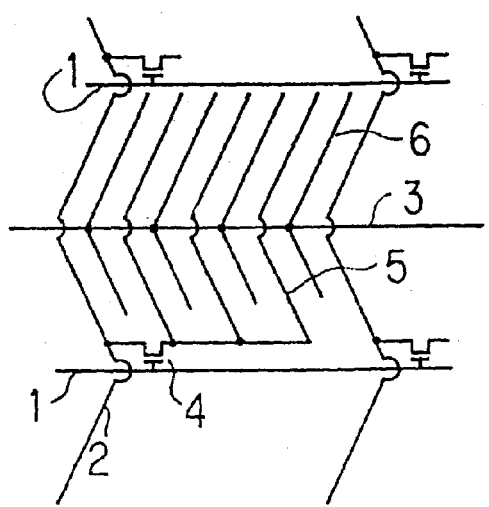
FIG. 3 is a plan view showing a unit pixel in a transverse electric field system in the present invention (embodiments 1 and 3).
Figure 4:
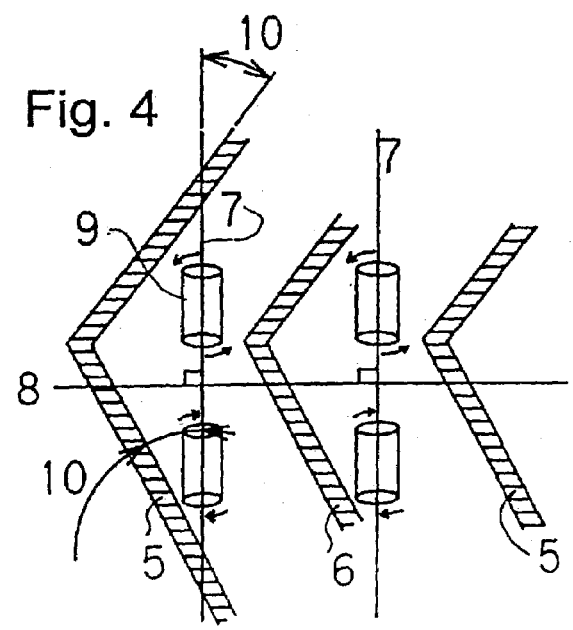
FIG. 4 is a diagram showing an alignment direction of a P-type liquid crystal in a transverse electric field system in the present invention.

FIGS. 3 and 4 are plan views of a unit pixel showing a basic operational principle of the first embodiment of the present invention. In this example, dielectric anisotropy of the liquid crystal molecule is positive. In FIG. 3, numeral 1 designates a scanning line, numeral 2 is a video signal line, numeral 3 is a common line, numeral 4 is a thin film transistor (TFT), numeral 5 is a pixel electrode (liquid crystal drive electrode), and numeral 6 is a common electrode.

In FIG. 4, numeral 5 designates a pixel electrode (liquid crystal drive electrode), numeral 6 is a common electrode, numeral 7 is a alignment direction of the liquid crystal molecules as well as a polarization axis of a polarizing plate, numeral 8 is a polarization axis of the other polarizing plate, numeral 9 is a liquid crystal molecule of a positive dielectric anisotropy under zero electric field (P-type liquid crystal molecule), and numeral 10 is an angle that is formed by crossing the alignment direction of the P-type liquid crystal molecule and the pixel electrode.

Figure 7:
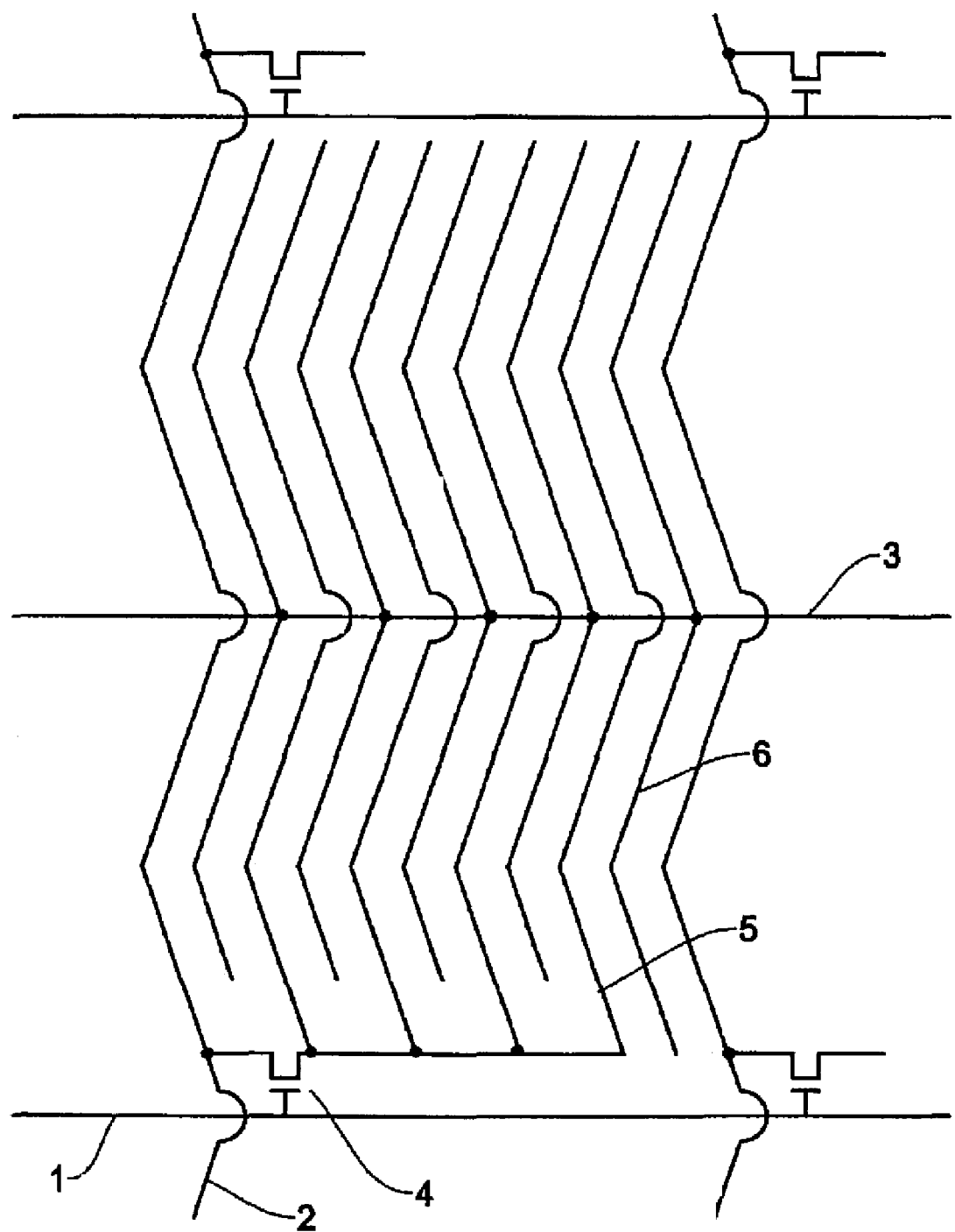
FIG. 7 is a diagram showing an example of application of a unit pixel in a transverse electric field system of the present invention (embodiments 1 and 3).
Figure 9:
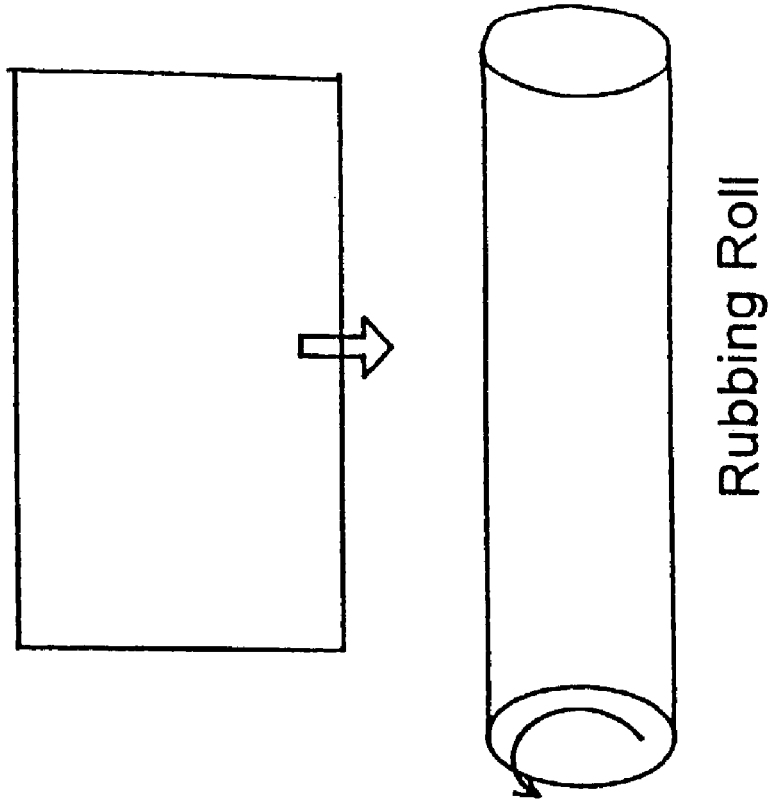
FIG. 9 is a diagram showing a relationship between a rubbing roll and a substrate in a rubbing process of the present invention.
Figure 8:
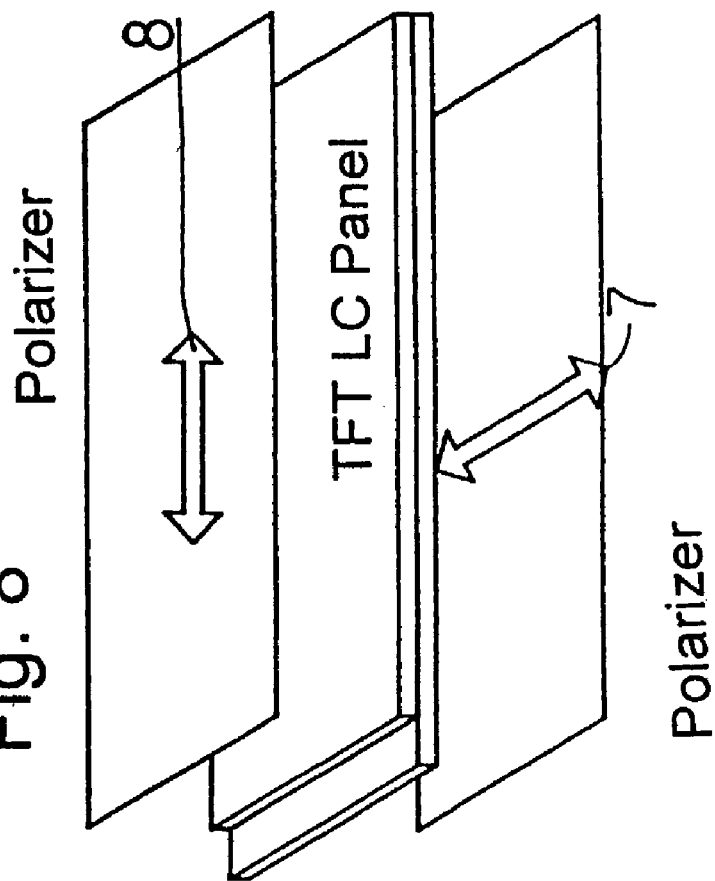
FIG. 8 is a diagram showing a relationship between a polarization axis of a polarizing plate and a liquid crystal in the present invention.

As shown in FIGS. 3 and 4, the video signal line 2 and the pixel electrodes 5 and the common electrodes 6 are so configured as to be bent relative to the alignment direction of the P-type liquid crystal. The bent angle 10 can be selected so as to show the best display performance as long as the angle is within the range from ±1 to ±30 degrees. As shown in FIG. 7, there is no limit in the number of bent of the electrodes.

Embodiment 2

Figure 5:
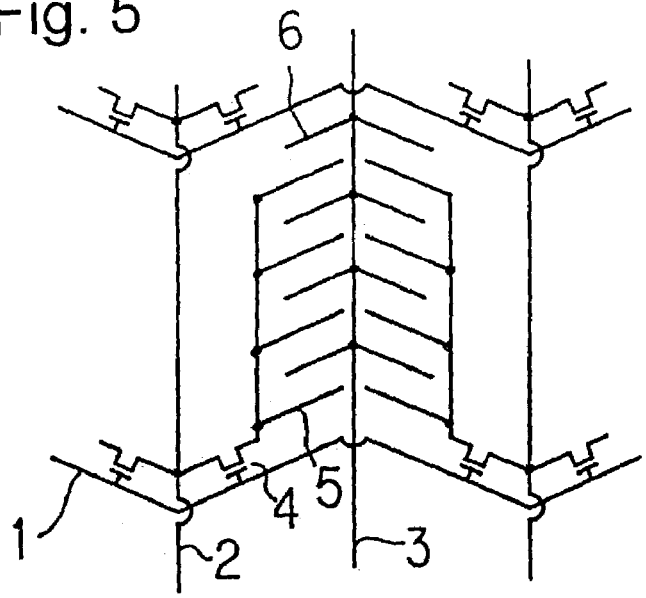
FIG. 5 is a plan view showing a unit pixel in a transverse electric field system in the present invention (embodiments 2 and 4).

FIGS. 4 and 5 are plan views of a unit pixel showing a basic operational principle of the second embodiment of the present invention. In this example, dielectric anisotropy of the liquid crystal molecule is positive. As shown in FIGS. 4 and 5, the scanning line 1 and the pixel electrodes 5 and the common electrodes 6 are so configured as to be bent relative to the alignment direction of the P-type liquid crystal. The bent angle 10 can be selected to be an angle with the best display performance as long as the angle is within the range from ±1 to ±30 degrees. As shown in FIG. 7, there is no limit in the number of bent of the electrodes.

[Embodiment 3]

Figure 6:
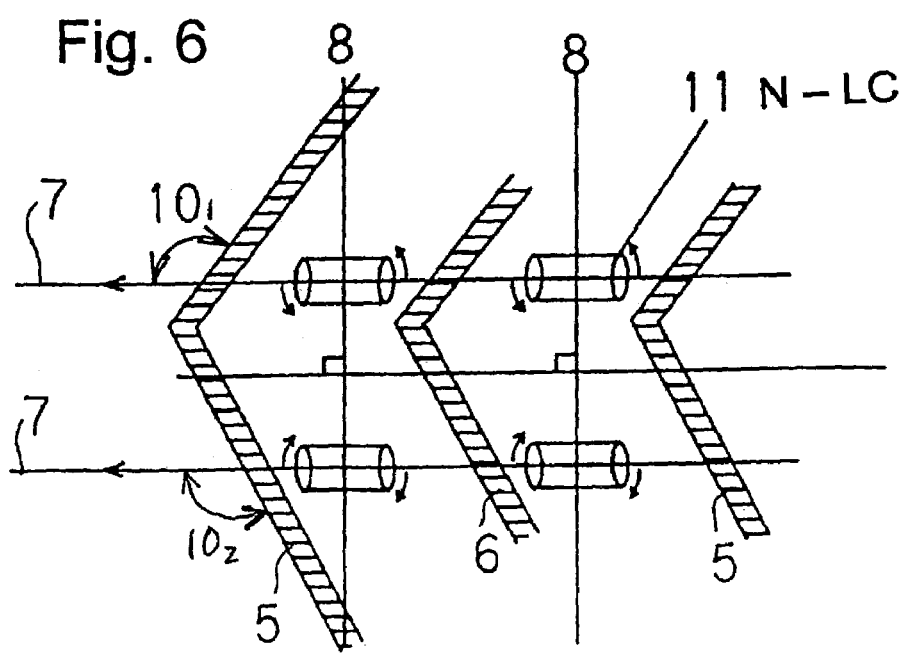
FIG. 6 is a diagram showing an alignment direction of an N-type liquid crystal in pixels of a transverse electric field system in the present invention.

FIGS. 3 and 6 are plan views of a unit pixel showing a basic operational principle of the third embodiment of the present invention. In this example, dielectric anisotropy of the liquid crystal molecule is negative. In FIG. 6, numeral 5 designates a pixel electrode (liquid crystal drive electrode), numeral 6 is a common electrode, numeral 7 is an alignment direction of the liquid crystal molecule as well as a polarization axis of a polarizing plate, numeral 8 is a polarization axis of the other polarizing plate, numeral 10 is an angle that is formed by crossing the alignment direction of the N-type liquid crystal molecule and the pixel electrode, and numeral 11 is a liquid crystal molecule of a negative dielectric anisotropy under zero electric field (N-type liquid crystal molecule). As shown in FIGS. 3 and 6, the video signal line 2 and the pixel electrodes 5 and the common electrodes 6 are so configured as to be bent relative to the alignment direction of the N-type liquid crystal. The bent angles $10_1$ and $10_2$ relative to the alignment direction are opposite in polarity and about the same absolute value with one anther as shown in FIG. 6. In actual implementation, the bent angle is selected to be an angle with the best display performance as long as the angle is within the range from 60 degrees to 120 degrees except 90 degrees. As shown in FIG. 7, there is no limit in the number of bent of the electrodes.

[Embodiment 4]

FIGS. 5 and 6 are plan views of a unit pixel showing a basic operational principle of the fourth embodiment of the present invention. In this example, dielectric anisotropy of the liquid crystal molecule is negative. As shown in FIGS. 5 and 6, the scanning line 1 and the pixel electrodes 5 and the common electrodes 6 are so configured as to be bent relative to the alignment direction of the N-type liquid crystal. The bent angle 10 can be selected to be an angle with the best display performance as long as the angle is within the range from 60 degrees to 120 degrees except 90 degrees. As shown in FIG. 7, there is no limit in the number of bent of the electrodes.

[Embodiment 5]

Figure 11:
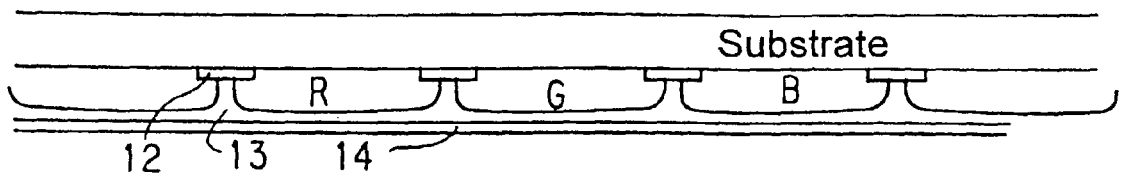
FIG. 11 is a cross sectional view of a color filter substrate used in a transverse electric field system.
Figure 12:
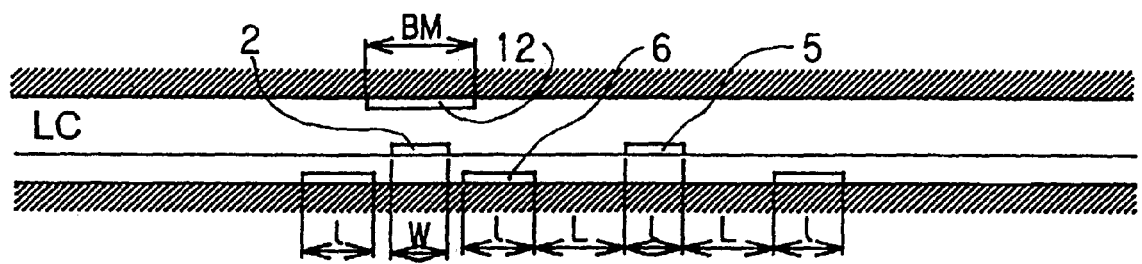
FIG. 12 is a diagram showing a configuration of a black mask of a color filter, a common electrode and a video signal line used in a transverse electric field system.

FIGS. 11–14 are cross-section views and plan views of the substrate used in the present invention viewed from the side of a color filter. In FIG. 11, numeral 12 designates a black mask to block the light therethrough. Numeral 13 is a flat film to remove surface irregularities, numeral 14 is an alignment film to align the liquid crystal. In FIG. 12, numeral 5 designates a pixel electrode (liquid crystal drive electrode), numeral 6 is a common electrode, numeral 2 is a video signal line, and numeral 12 is a black mask.

In the case where the black mask is conducive, an appropriate width BM of the black mask is the sum of the width 1 of the common electrode and the width W of the video signal line 2. In FIG. 12, a reference label L designates a gap between the pixel electrodes and a reference label BM designates a width of the black mask of the color filter.

Figure 13:
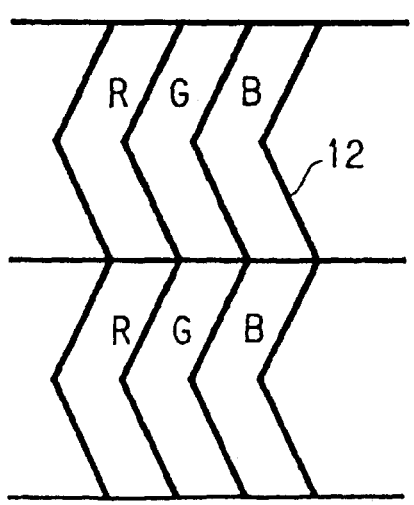
FIG. 13 is a plan view showing a color filter used in the present invention (embodiments 1 and 3).
Figure 14:
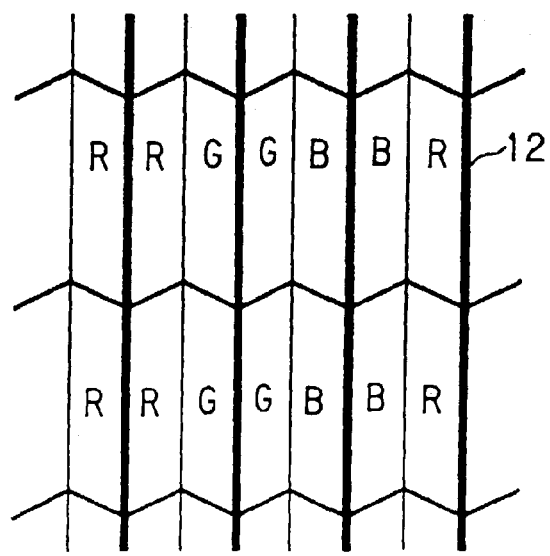
FIG. 14 is a plan view showing a color filter used in the present invention (embodiments 2 and 4).

As shown in FIGS. 13 and 14, the color filter and black mask are bent to be associated with the embodiments 1–4 above. There is no limit in the number of bent of the electrodes.

As shown in FIGS. 4 and 6, the liquid crystal molecules rotate in the two directions, a left rotation and a right rotation, in the pixel between the pixel electrode (the liquid crystal drive electrode) and the common electrode as shown in FIGS. 4 and 6 when the electric field is produced in the pixel electrodes.

According to the present invention, it is possible to avoid the deterioration of the visual field angle even when the tilt angle is increased. Therefore, it is possible to achieve a large screen, wide visual angle liquid crystal display with high yield and low cost.

What is claimed is:

1. An active matrix liquid crystal display device, comprising:
   a pair of substrates, at least one of which is transparent;
   a liquid crystal composite layer provided between said substrates and having a negative dielectric constant;
   a plurality of scanning lines and video signal lines provided in a matrix manner on a surface of one of said substrates facing the other substrate;
   a plurality of pixel electrodes each having a comb like shape;
   a plurality of common electrodes each having a comb like shape and connected to a common line, wherein said pixel electrode and the common electrode are interdigitally aligned with one another in each pixel;
   active elements connected to said pixel electrodes, said scanning lines and said video signal lines, respectively;
   wherein each of said pixel electrodes and common electrodes are inclined in first and second directions to form a zigzag shape which is symmetrical relative to the alignment direction of the liquid crystal, where the first direction is within an angle ranging between plus 60–120 degrees except 90 degrees relative to the alignment direction of the liquid crystal, while the second direction is within an angle ranging between minus 60–120 degrees except 90 degrees relative to the alignment direction.

2. A liquid crystal display device having an active element as defined in claim 1, wherein said video signal lines are inclined in the first and second directions in parallel with said pixel electrodes and said common electrodes to form a zigzag shape which is symmetrical relative to said alignment direction where the first direction is within an angle ranging between plus 60–120 degrees except 90 degrees relative to the alignment direction, while the second direction is within an angle ranging between minus 60–120 degrees except 90 degrees relative to the alignment direction.

3. A liquid crystal display device having an active element as defined in claim 2, further comprising a color filter and a black mask which are inclined in first and second directions in parallel with said pixel electrodes and said common electrodes to form a zigzag shape which is symmetrical relative to said alignment direction where the first direction is within an angle ranging between plus 60–120 degrees except 90 degrees relative to the alignment direction, while the second direction is within an angle ranging between minus 60–120 degrees except 90 degrees relative to the alignment direction.

4. A liquid crystal display device having an active element as defined in claim 1, further comprising a color filter and a black mask which are inclined in first and second directions in parallel with said pixel electrodes and said common electrodes to form a zigzag shape which is symmetrical relative to said alignment direction where the first direction is within an angle ranging between plus 60–120 degrees except 90 degrees relative to the alignment direction, while the second direction is within an angle ranging between minus 60–120 degrees except 90 degrees relative to the alignment direction.

5. A liquid crystal display device having an active element as defined in claim 1, wherein said scanning lines are inclined in the first and second directions in parallel with said pixel electrodes and said common electrodes to form a zigzag shape which is symmetrical relative to said alignment direction where the first direction is within an angle ranging between plus 60–120 degrees except 90 degrees, while the second direction is within an angle ranging between minus 60–120 degrees except 90 degrees relative to the alignment direction.

6. A liquid crystal display device having an active element as defined in claim 5, further comprising a color filter and a black mask which are inclined in first and second directions in parallel with said pixel electrodes and said common electrodes to form a zigzag shape which is symmetrical relative to said alignment direction where the first direction is within an angle ranging between plus 60–120 degrees except 90 degrees relative to the alignment direction, while the second direction is within an angle ranging between minus 60–120 degrees except 90 degrees relative to the alignment direction.

* * * * *